United States Patent [19]

Cotic

[11] 4,272,680

[45] Jun. 9, 1981

[54] MODULAR ARRAY RADIATION DETECTOR

[75] Inventor: Dennis J. Cotic, Pewaukee, Wis.

[73] Assignee: General Electric Company, Milwaukee, Wis.

[21] Appl. No.: 99,537

[22] Filed: Dec. 3, 1979

[51] Int. Cl.[3] .................................... G01T 1/18

[52] U.S. Cl. .................................... 250/375; 250/385

[58] Field of Search ........... 250/374, 375, 385, 445 T, 250/490; 29/25.1; 313/93

[56] References Cited

U.S. PATENT DOCUMENTS

| | | | |
|---|---|---|---|
| 4,119,853 | 10/1978 | Shelley et al. | 250/385 |
| 4,150,373 | 4/1979 | Ried, Jr. | 250/381 |
| 4,161,655 | 7/1979 | Cotic et al. | 250/385 |

*Primary Examiner*—Alfred E. Smith
*Assistant Examiner*—Janice A. Howell
*Attorney, Agent, or Firm*—Douglas E. Stoner; Dana F. Bigelow

[57] ABSTRACT

A radiation detector is fabricated by the insertion into an arcuate support structure, a plurality of modules comprised of ceramic members with electrode plates disposed therebetween. Securing of the ceramic members to the support structure is accommodated by threaded fasteners which pass through the support section into inserts which are bonded into cavities formed in the ceramic members. Before installation of the module into the support structure, the modules can be tested and the better performing modules can then be installed in the central portion of the support structure.

22 Claims, 12 Drawing Figures

MODULAR ARRAY RADIATION DETECTOR

BACKGROUND OF THE INVENTION

This invention relates generally to detection apparatus and more particularly to detectors of ionizing radiation, such as x-ray and gamma radiation. The invention is described in terms of apparatus useful in x-ray computerized axial tomography systems.

A well known approach for the detection of radiation, such as x-ray and the like, is to provide a pressurized gas filled chamber in the path of the radiation transmission. Within the gas chamber, there are provided a plurality of spaced electrodes which are supported on their opposite ends by ceramic insulating members which are in turn secured to a metal support structure. The spaced electrodes include alternate bias and collector electrode plates, the bias plates being connected to a voltage source and the collector plates being connected to instrumentation for measuring the currents in the individual collector plates. In operation, the radiation enters the gas filled gaps between the electrodes and causes the gas to ionize so as to create photoelectrons and/or ions. These are then biased by the bias electrodes and are collected on the collector electrodes to thereby generate electrical signals which correspond to the degree of ionization in the respective gas filled gaps. In this manner, the degree of radiation within each gap is determined. Such an apparatus is shown and described in U.S. Pat. No. 4,119,853, issued to Shelly et al. on Oct. 10, 1978 and assigned to the assignee on the present invention.

Radiation detectors in general, and especially detectors used in computerized axial tomography, must detect x-ray protons efficiently and with a high degree of resolution. To obtain good spatial resolution, it is desirable to have the electrode plates spaced closely and uniformly over the entire length of the detector. It is also important for each cell, as defined by a pair of adjacent electrode plates, to have identical and stable detecting characteristics. A further complication is that of the likelihood of undesirable microphonics which may exit in such an apparatus. In such a structure where thin metal electrodes must operate in close proximity with a relatively larger electrical potential between them, mechanical vibrations transmitted to the plates may significantly vary the distance between them and thus introduce microphonic current changes which in turn may cause errors in the x-ray intensity measurements. In view of these sensitive structural requirements, the particular fabrication techniques employed have been of utmost importance in obtaining a detector structure with the desired performance characteristics.

The present methods of detector assembly call for the use of a pair of insulator members to extend substantially the length of their respective support members. First, there are formed on one side of each of the insulator members, a plurality of grooves for receiving the electrodes. Then the insulator members are bonded along their entire lengths to their respective metal support members. The support members are then interconnected at the ends and the electrodes are installed and bonded in their respective grooves. Finally, the leads are attached to the electrode plates with alternate leads going to the voltage source and current measuring instrumentation.

Because of its structural stability and insulating characteristics, it has been found that the ceramic material is preferred for use as the insulating members. However, it is recognized that such a material is very brittle and susceptible to breakage if stress concentrations occur. Accordingly, the bonding method by which the ceramic members are adhesively attached to the metal support structures has been found to be most effective. However, it will be seen that such a method is of a relatively permanent nature and does not allow for subsequent disassembly and reassembly of the structure. In other words, if after the assembly is completed, it is found that there are portions that are defective, the entire detector assembly must be discarded since the present method requires the insulating members to be somewhat permanently assembled into the support structure before the electrode plates are installed.

A detector array which is used in computerized tomography systems has an inherent operational characteristic which is cause for furthering the scrappage and replacement costs. By the very nature of its operation, an annular detector array used in a typical rotating detector computerized tomography system is most reliant on that portion of the detector array in the circumferentially central region. This central area of the detector sees most of the body reconstruction area, and the central cell sees the total body reconstruction area. As you proceed outwardly, left or right, from the center cell, the cells see less and less of the total body reconstruction area, and, therefore, contain less total body information. Therefore, the performance specification of an x-ray detector array is generally established such that the standards of performance are hgher for those portions of the array which are in the circumferentially central area thereof. In other words, the specifications generally allow decreasing performance characteristics towards the circumferential ends of the annular detector array but require a very high performance level in the central portion thereof. It will thus be seen that, since performance tests cannot be conducted until the entire array can be assembled, if the specifications are then not met, the entire assembly must be scrapped. Of course, the greatest cause of scrappage is because of the array central portion not meeting specifications. This is true even though those arrays scrapped may have non-central portions which meet the most stringent performance standards. It is, therefore, an object of the present invention to provide an improved radiation detector assembly.

Another object of the present invention is the provision for reducing the amount of scrappage in the production of x-ray detector assemblies.

Still another object of the present invention is the provision for a radiation detector assembly having better performance characteristics in its central portion than in its non-central portions.

Still another object of the present invention is the provision for the conduct of certain performance tests prior to final application of a radiation detector assembly.

These objects and other features and advantages become readily apparent upon reference to the following description when taken in conjunction with the appended drawings.

SUMMARY OF THE INVENTION

Briefly, in accordance of one aspect of the invention, an annular radiation detector array is made up of a plurality of modules which are individually installed in circumferential spaced relationships between a pair of spaced metal support bars. By the use of fixtures, the individual modules are assembled with their spaced ceramic insulating members and interconnecting, relatively spaced, electrode plates. Each of the modules is then tested as a unit to determine its performance characteristics. Based on those test results, individual modules are then placed in selected circumferential positions within the support members such that the modules having higher performance characteristics are located toward the central portion of the detector assembly. The modules are then secured within the support structure by a fastening means.

To facilitate the securing of the ceramic members to the metal support members, the ceramic members first have a plurality of cavities formed in their respective outer sides. A metal insert, having internal threads, is then bonded into each one of these cavities for receiving a fastener in such a way as to cause little stress in the ceramic material. Modules are then selectively placed in the desired circumferential positions within the metal support structure and releasably secured therein by the placement of threaded fasteners through holes formed in the metal support members and into the individual inserts. In this way, a stable, high performance structure is obtained.

DESCRIPTION OF THE PREFERRED EMBODIMENT

Figure 1:
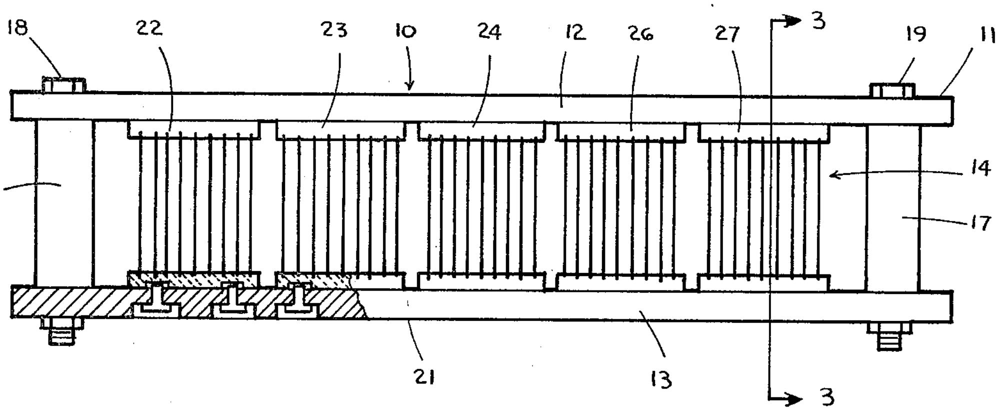
FIG. 1 is a longitudinal view, partially sectioned, of a detector assembly fabricated in accordance with the present invention.

Referring now to FIG. 1, the invention is shown generally at 10 as forming part of a detector assembly 11 for placement within a pressure vessel or chamber (not shown) which is then filled with an ionizable gas in a manner well known in the art. The high pressure chamber with included detector assembly is exposed to radiation, such as x-rays or the like, emanating from a body being detected, and the enclosed gas is ionized so as to cause the flow of currents in the detector assembly, which are indicative of the specific locations and intensity of radiation.

The detector assembly 11 comprises upper and lower support members 12 and 13 fabricated from a metal, such as stainless steel or the like, and disposed in spaced parallel relationship to partially define a cavity 14 therebetween. The support members 12 and 13 are interconnected at their ends by spacers 16 and 17 with fasteners 18 and 19, such as bolts or the like, for further defining the cavity 14 and forming a rigid frame 21 for supportedly receiving the active elements of the detector assembly.

Disposed within the frame 21, in close fit relationship between the upper and lower support members 12 and 13, are a plurality of detector modules 22, 23, 24, 26 and 27, spaced circumferentially along the curved length of the frame 21. These modules are substantially identical in structure but are preferably of different performance characteristics as will be more fully described hereinafter. The number of modules within any single detector assembly is not significant and may be varied, upwardy or downwardly, from the five as shown and still remain within the intent of the present invention; however, for reasons to be discussed hereinafter, it is preferable that an odd number of modules be used such that a single detector module is disposed proximate the circumferential midpoint of the assembly that is the position occupied by the module designated 24 in the FIG. 1 embodiment.

Figure 2:
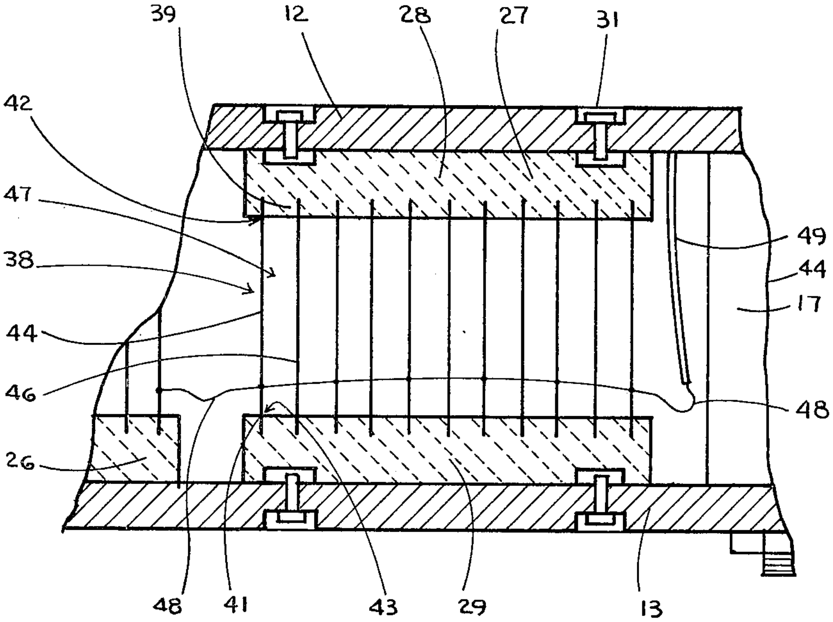
FIG. 2 is a partial sectional view of the detector assembly showing a module portion thereof.
Figure 4:
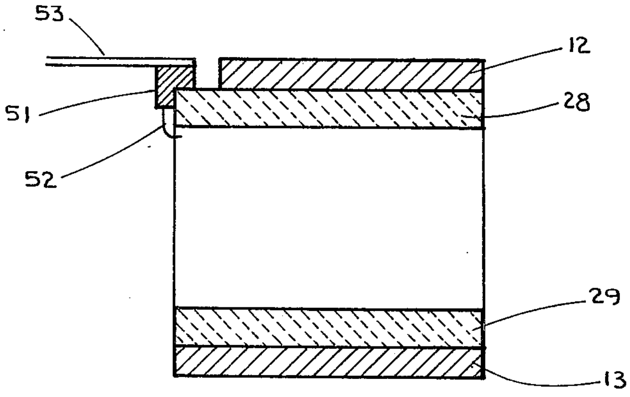
FIG. 4 is a cross-sectional view of a module in the installed position as seen along lines 3—3 of FIG. 1.
Figure 3:
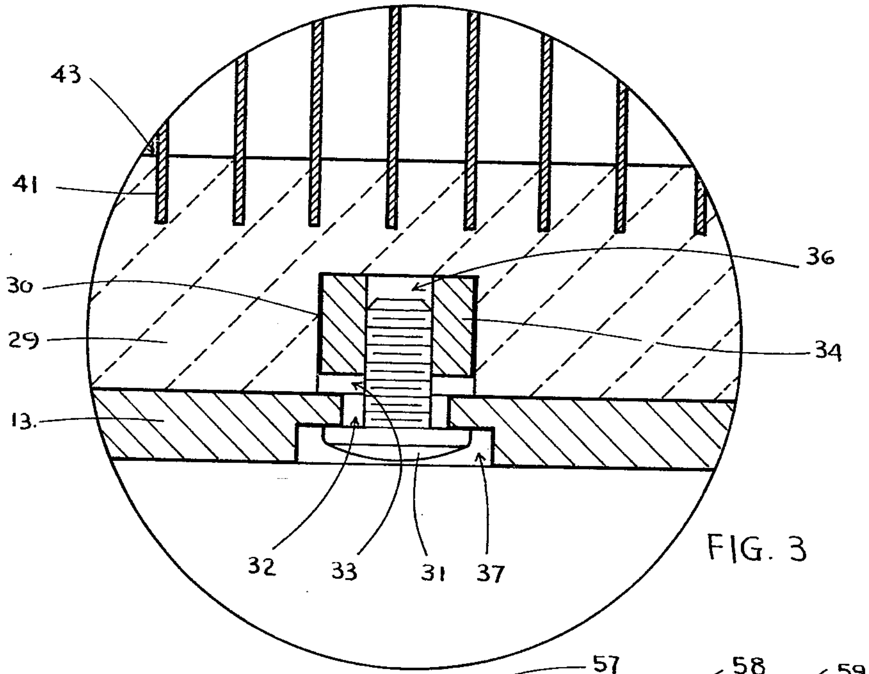
FIG. 3 is an expanded cross sectional view of a portion thereof showing the fastener attachment of the invention.

The details of construction and manner of installation of the modules within the frame 21 can be more clearly seen by reference to FIGS. 2, 3 and 4 wherein the module 27 is shown in its installed position intermediate the upper and lower support members 12 and 13 at one end of the detector assembly 11. The module 27 comprises upper and lower insulating members 28 and 29, fabricated from a ceramic material such as Macor, which is commercially available under the trademark of that name. Such a ceramic material serves as an excellent dialetic in terms of its non-conductive and heat resistant properties; however, it will be recognized that a ceramic is inherently brittle and, therefore, presents problems in regard to its attachment to the frame 21. This attachment becomes even more important when considering the undesirable microphonics which tend to occur when the insulating members 28 and 29 are not securely fastened to the respective upper and lower support members 12 and 13.

In accordance with the present invention, the individual modules are secured within the frame 21 by way of a plurality of threaded fasteners 31 which project through holes 32 (FIG. 4) formed in the upper and lower support members 12 and 13 and into cavities 33 formed in the insulating members 28 and 29. The cylindrical cavities 33 are formed in the outer surfaces of the upper and lower insulating members 28 and 29 by way of a standard drilling operation. An appropriate adhesive material 30 is then applied to the walls and bottom of the cavity 33 and a preformed insert 34, having an outer diameter slightly smaller than the diameter of a cavity 33, is then inserted into the cavity. A suitable adhesive to form the bond between the ceramic insulator member and the insert, which may be of a material such as stainless steel, is one which is available commercially under the name epoxy. The insert 34 has an aperture 36 formed therein with internal threads for threadably receiving the fastener 31. In this way, the fastener 31 can be screwed into the threaded aperture 36 to bring the lower insulator member 29 into tight engagement with the lower support member 13 without creating severe stress concentrations in the insulator member 29. This is possible because of the transmission of forces from the support member 13 through the fastener 31, the insert 34, the adhesive 30, and the substantial surface area of the cavity 33. As shown, a countersink 37 may be formed in the support member 13 so as to receive the head of the threaded fastener 31. As will be seen, a typical module installation involves the use of four threaded fasteners with their associated inserts. It will be recognized that release and removal of the modules for the purposes of repair or replacement can be accomplished by simply unscrewing the threaded fasteners and sliding the modules out from between the upper and lower support members.

In addition to the upper and lower insulating members 28 and 29, the modules comprise a plurality of electrode plates, shown generally at 38, disposed between and interconnecting the upper and lower insulating members 28 and 29. The upper and lower ends, 39 and 41, of the plates fit into grooves 42 and 43, respectively, formed in the upper and lower insulating members 28 and 29. The grooves 42 and 43 are formed in the insulating members at an early stage of the fabrication process. They are substantially parallel but have a slight diversion toward the convex side of the curved detector assembly so as to accommodate a radial alignment of the electrode plates 38. A securing of the electrode plates 38 within the grooves 39 and 41 is accomplished by way of an adhesive to be applied in accordance with the procedures set forth in U.S. patent application Ser. No. 971,201 filed on Dec. 20, 1978 and assigned to the assignee of the present invention. As disclosed in that co-pending application, the electrode plates 38 comprise alternately disposed bias electrode plates 44 and signal electrode plates 46, with each pair defining a cell 47 therebetween. Each of the cells 47 is filled with the ionizing gas which, when exposed to radiation, tends to ionize and cause a flow of current in the signal electrode 46. The bias electrodes 44 are electrically connected to a common lead 48 which in turn is connected to a voltage source (not shown) of approximately 500 volts by way of a lead 49. In assembly, the common lead from the end module 28 is spot welded to the lead 49 going to the power source. The common lead 48 from the module 26 is likewise spot welded to the other end of the common lead 48 from the module 27 as shown. The function of the high voltage bias electrodes 44 is to bias the flow of photoelectrons and/or ions created by the ionizing radiation toward the signal or collector electrode plates 46.

To facilitate the transmission of the electrical signals from the signal electrode plates 46, a slotted strip 51 is attached by way of a suitable adhesive to edge of the upper insulator member 28. As can be seen, the cross-section of the strip 51 is generally L-shaped. A fine lead wire 52 passes from each of the signal electrode plates 46 through slots (not shown) in the slotted strip 51 to a printed circuit strip 53. Thus, in a manner more fully described in U.S. Pat. No. 4,119,853, issued on Oct. 10, 1978 and assigned to the assignee of the present invention, the individual signal electrode plates are electrically connected to outside signal processing apparatus.

In order to more fully appreciate the advantages of the modular concept as described hereinabove, it might be well to examine the inherent operating characteristics and performance requirements of a typical detector assembly installed in an x-ray computerized axial tomography system. As mentioned hereinbefore, that part of the detector assembly which is located substantially in the circumferential center of the detector unit, is more critical and performance demanding than are those toward the circumferential ends of the detector assembly. It also is desirable to have the higher performance modules toward the central portion of the assembly.

Figure 5:
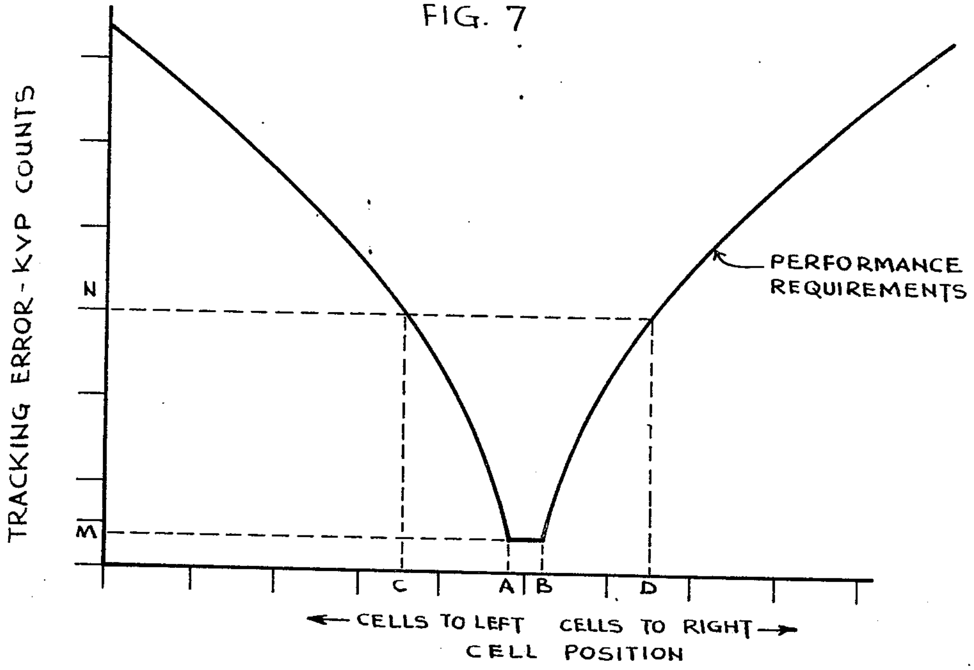
FIG. 5 is a graphic representation of typical performance requirements for a detector module.

Preferably, in order not to have wing artifacts in the final image, each detector cell should respond substantially in the same way as its adjacent cells with variations in time, in x-ray intensity and in spectrical content. A common test to determine these characteristics is that for kVp linearity wherein the x-ray tube voltage is varied between two voltage levels to determine whether adjacent cells respond in a similar manner. These performance requirements are best illustrated by reference to FIG. 4 which represents the non-linear tracking of polyenergic x-ray spectrum in a kVp (kilovolt potential) performance test. This test is conducted by exposing a radiation detector array to two different voltage levels and comparing the response of each cell with a reference response obtained from a plurality of reference cells to obtain an error figure. The error is computed in terms of kVp counts and is indicated at the ordinate of the graph in FIG. 5. The scale on the absissa is representative of the position of the individual cells with respect to the circumferential array of cells, with the cells being either to the left or to the right of the central position. The shaded area in the central portion of the graph is indicative of the cell span of a typical module in accordance with the present invention. It should be kept in mind that the central module is by far the most critical of the array and, therefore, has higher performance requirements than the others.

The gull wing graph shown in FIG. 4 is a typical performance requirement for a detector array assembly in a computerized tomography system. As can be seen, in the central portion of the central module, between the cell represented by the letter "A" on the left and the cell represented by the letter "B" on the right, the performance requirements are the most stringent, that is the tracking error cannot exceed a relatively low kVp count represented by the letter "M." As we proceed circumferentially outward, to the left and right of that central portion, the degree of excellence in the performance requirements steadily decreases until at the circumferential edges of the central module it is permissible to have a tracking error up to a kVp count indicated by the letter "N." As we proceed further outward, and extending into the area of other modules, it will be seen that even greater error is allowable in the cells. Accordingly, it is obvious from this discussion that the central module is primarily determinant of the performance quality of the array when taken as a whole.

In the prior art detectors, wherein the insulator members were single members which were substantially non-releasably attached directly to the support members and then the entire array electrode plates were installed, the array could not be classified in respect to its performance until the entire assembly was fabricated. At that time, if the central cells were found to not meet the stringent requirements as indicated by the graph of FIG. 4, the entire assembly was necessarily scrapped. This was true even though there were other cells outside of that central portion which may meet those stringent performance requirements.

The present system allows for a preliminary test of individual modules such that modules which are determined to have a high performance characteristic, that is a low tracking error, can be placed in the central position of the array and those with lower performance characteristics can be placed towards the ends of the array.

Figure 6A:
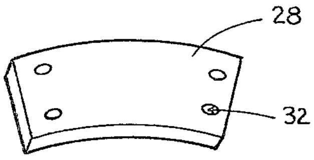
FIGS. 6A through 6F are schematic illustrations of the sequence of operations in accordance with a preferred embodiment of the invention.
Figure 6B:
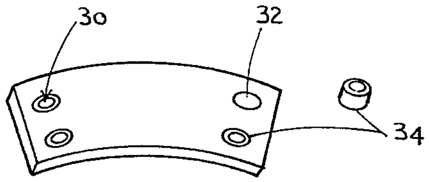
Figure 6C:
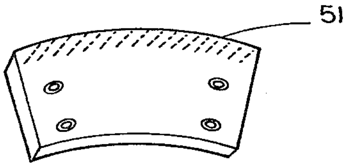
Figure 6D:
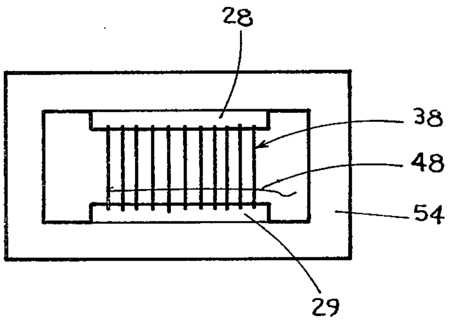
Figure 6E:
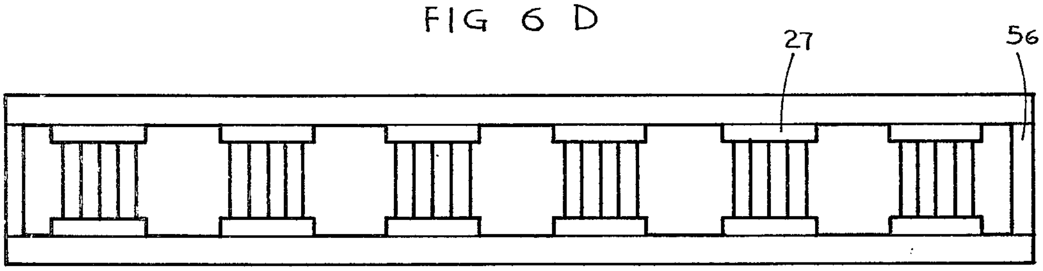
Figure 6F:
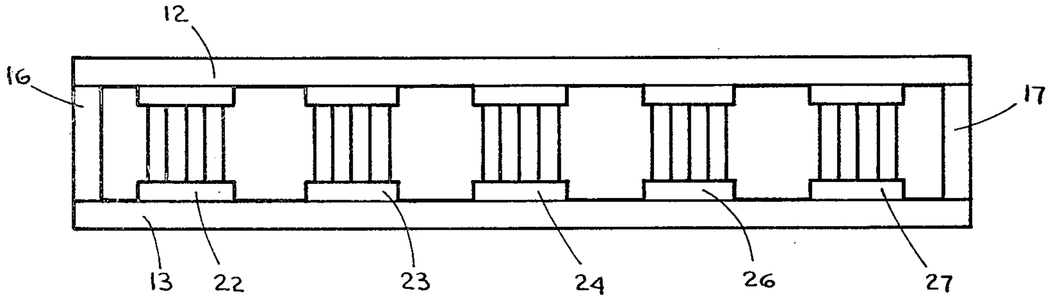

A suggested sequence of operation of frabricating and testing the modules and for placement within a support frame of a detector assembly is shown in FIGS. 6A through 6F. The first step is to form the holes 32 in the outer sides of each of the insulator members 28 and 29. This is accomplished by a simple drilling operation. Grooves, of course, are formed on the inner side of each of the insulator members and can be accomplished either before or after drilling of the holes 32. Next, the adhesive is applied to each of the holes 32 and inserts 34 are placed within the holes as shown in FIG. 6B and allowed to dry. The slotted strip 51 is then bonded to the rear edge of the upper insulator member as shown in FIG. 6C by use of a suitable adhesive, such as apoxy resin or the like. Next, the upper and lower insulating members 28 and 29 are placed in an assembly fixture 54 to facilitate the fabrication of an individual module. This is accomplished by first attaching each of the insulator members to the fixture 54 by applying threaded fasteners to the inserts 34. The tungsten electrode plates 38 are then inserted into the slots in the insulating members and bonded in a manner described hereinabove. The bias plates are then electrically connected to the common lead 48 for later attachment to a voltage potential, and the signal electrode plates 46 are electrically connected to a printed circuit strip 53 by way of lead wires 52 which pass through the slots and the slotted strip 51. The finished module is then released by removing the threaded fasteners and removed from the assembly fixture 54 for testing. A plurality of modules are then placed in a test fixture 56 as shown in FIG. 6E with each of the circuit strips being connected to a suitable type of electrical readout test apparatus. Modules are then submitted to the kVp performance test as described hereinabove to determine the performance of the individual cells therein. Based on those performance tests, each of the modules tested can then be evaluated to determine whether or not they meet the requirements as indicated by the graphic illustrations of FIG. 4. Those modules which do meet the requirements can then be placed in the central position as shown by the module 24 in FIG. 6F and those modules with less desirable characteristics can be placed toward the ends of the module array, as occupied by the modules 22 and 27 of the illustration. In this manner of selective placement and fabrication, the detector assembly array can be tailored to the desired requirements and the scrapping of entire assemblies is avoided. In fact, provided there are a reasonable number of high performance modules resulting from the fabrication processes shown in FIG. 6D, it will not be necessary to scrap even an individual module.

Figure 7:
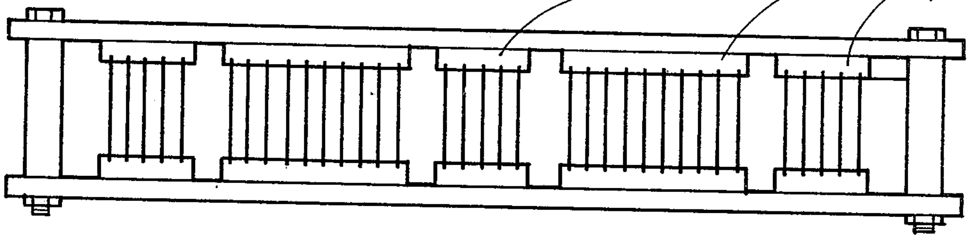
FIG. 7 is an alternate embodiment of the invention.

The invention has been described hereinabove as applied to modules of equal length. However, depending on various factors, such as the dimension requirements of the detector assembly, the various considerations in the build-up and test of the modules and the later installation in the support frame, and the considerations for replacement of one or more of the modules, the circumferential length of the modules may be varied in a uniform or a non-uniform manner. FIG. 7 shows an alternate embodiment wherein the central module 57 is small in circumferential length. The modules 58 on either side thereof are of greater length and those modules 59 at the ends are again a smaller length. It will, of course, be understood that any of various length and shape combinations can be made to accommodate the particular requirements of the system at hand.

Although the invention has been described in substantial detail of a preferred embodiment, it will be understood that the description is intended to be illustrative only and not limiting to that particular embodiment. Rather the principles disclosed herein may be variously embodied and the invention is to be limited only by the interpretation of the claims which follow.

I claim:

1. An improved support structure for a radiation detector apparatus of the type having a pair of spaced insulating members with a plurality of electrodes disposed therebetween for defining gaps to be filled by a gas for producing photoelectronion pairs when radiation enters the gaps, wherein the improvement comprises:

a pair of support members spaced in generally parallel relationship and having their ends interconnected to form a rigid structure for receiving said pair of insulating members therein; and fastening means for rigidly and releasably attaching at a plurality of points said pair of insulating members to said rigid structure, with each of said insulating members being in parallel contiguity with one of said pair of support members.

2. An improved support structure as set forth in claim 1 wherein said fastening means comprises a plurality of threaded fasteners, each passing through one of said pair of support members and into the plane of one of said pair of insulating members.

3. An improved support structure as set forth in claim 2 wherein said insulating members are fabricated from ceramic material.

4. An improved support structure as set forth in claim 3 wherein said support members have a plurality of holes formed therein, each hole having one of said plurality of threaded fasteners passing therethrough.

5. An improved support structure as set forth in claim 2 wherein said insulating material has a plurality of holes formed therein and said fastening means further include an insert of each of said plurality of holes, with each insert having a hole formed therein for receiving one of said threaded fasteners.

6. An improved support structure as set forth in claim 5 wherein each of said plurality of inserts is bonded within its respective hole by an adhesive material.

7. An improved support structure as set forth in claim 1 wherein said pair of support members form a rigid support structure for receiving more than one of said pair of insulating members, with each of said pair of insulating members comprising a module which forms a segment of the detector apparatus having a plurality of modules.

8. An improved support structure as set forth in claim 7 wherein said detector apparatus is arcurate in form with each of said plurality of modules being circumferentially spaced from at least one other of said plurality of modules.

9. An improved support structure as set forth in claim 8 wherein the circumferential length of one of said plurality of modules is less than at least one other of said plurality of modules.

10. An improved support structure as set forth in claim 9 wherein said one module of less length is disposed proximate the circumferential central portion of said detector apparatus.

11. An improved support structure as set forth in claim 8 wherein said plurality of modules are of different performance quality and further wherein the better quality modules are proximate the circumferential center of said detector apparatus.

12. An improved support structure as set forth in claim 8 wherein said plurality of modules are of different performance quality and further wherein the best quality module occupies the circumferential central portion in said detector apparatus.

13. An improved method of constructing a radiation detector apparatus having a pair of spaced support members, a pair of spaced insulation members disposed adjacent to the respective support members, and a plurality of electrodes rigidly secured in circumferential spaced relationship between the pair of insulator members, wherein the improvement comprises the steps of: (a) forming a plurality of cavities in the pair of insulator members on the sides to be placed adjacent to the respective support members; (b) installing an insert into each of said cavities; and (c) installing a plurality of fasteners through each of the support members with each of said fasteners passing into each of one of said inserts to rigidly secure the insulator members to their respective support members.

14. An improved method as set forth in claim 13 and including a preliminary step of forming a plurality of holes in said support members for the passing of said fasteners therethrough.

15. An improved method as set forth in claim 14 and including the step of forming a counter-sink for each of said holes to receive a portion of said fasteners.

16. An improved method as set forth in claim 13 and including an intermediate step of bonding said inserts into said insulator cavities.

17. An improved method as set forth in claim 13 wherein said insulator members are fabricated of a metal material.

18. An improved method as set forth in claim 13 wherein said fasteners comprise threaded members.

19. An improved method as set forth in claim 13 wherein said inserts are fabricated of a ferrous material.

20. An improved method as set forth in claim 13 and including the intermediate steps of (a) fabricating a module comprising a pair of insulating members and a plurality of electrodes; (b) testing the module for performance; and (c) based on that performance, choosing a circumferential position within the pair of support members into which to place said module.

21. An improved method as set forth in claim 20 wherein modules exhibiting better performance characteristics are generally positioned toward the circumferential center of the support members.

22. An improved method as set forth in claim 20 wherein modules exhibiting performance characteristics above a predetermined level are placed in a central circumferential position of the support members.

* * * * *